United States Patent
Wakuda et al.

(10) Patent No.: US 10,452,579 B2
(45) Date of Patent: Oct. 22, 2019

(54) MANAGING INPUT/OUTPUT CORE PROCESSING VIA TWO DIFFERENT BUS PROTOCOLS USING REMOTE DIRECT MEMORY ACCESS (RDMA) OFF-LOADING PROCESSING SYSTEM

(71) Applicant: FUJITSU LIMITED, Kawasaki-shi, Kanagawa (JP)

(72) Inventors: Rinko Wakuda, Kawasaki (JP); Yuki Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/021,066

(22) Filed: Jun. 28, 2018

(65) Prior Publication Data

US 2019/0012282 A1    Jan. 10, 2019

(30) Foreign Application Priority Data

Jul. 5, 2017   (JP) ................. 2017-132037

(51) Int. Cl.
  *G06F 13/00*   (2006.01)
  *G06F 13/20*   (2006.01)
  (Continued)

(52) U.S. Cl.
  CPC .......... *G06F 13/20* (2013.01); *G06F 13/1663* (2013.01); *G06F 13/28* (2013.01); *G06F 13/42* (2013.01)

(58) Field of Classification Search
  CPC .................................................. G06F 13/20
  See application file for complete search history.

(56) References Cited

U.S. PATENT DOCUMENTS

| 7,502,333 B2 * | 3/2009 | Modi ................. H04L 41/0803 370/255 |
| 7,698,361 B2 * | 4/2010 | Mohamed ........... H04L 67/1097 709/203 |

(Continued)

FOREIGN PATENT DOCUMENTS

| JP | 2007-527057 | 9/2007 |
| JP | 2015-22755 | 2/2015 |
| WO | 2005/067430 | 7/2005 |

OTHER PUBLICATIONS

"NVIDIA GPUDirect", NVIDIA, [online], <URL:https://developer.nvidia.com/gpudirect>, retrieved on Mar. 23, 2017 (6 pages).

(Continued)

*Primary Examiner* — Tammara R Peyton
(74) *Attorney, Agent, or Firm* — Fujitsu Patent Center

(57) ABSTRACT

An information processing system includes: a first information processing device configured to transmit an input/output request to an information storage device; and a second information processing device coupled to the information storage device and configured to: perform an operation; retain an address value in a register; store the input/output request received from the first information processing device in a memory; output a reception notification indicating reception of the input/output request based on a result of comparison between a physical address of the memory, the input/output request being stored at the physical address, and the address value; generate a packet based on the input/output request stored at the physical address of the memory when receiving the reception notification; and output the generated packet to the information storage device.

9 Claims, 9 Drawing Sheets

(51) Int. Cl.
G06F 13/42 (2006.01)
G06F 13/16 (2006.01)
G06F 13/28 (2006.01)

(56) References Cited

U.S. PATENT DOCUMENTS

| | | | |
|---|---|---|---|
| 8,914,556 B2* | 12/2014 | Magro | G06F 13/14 |
| | | | 710/22 |
| 9,838,498 B2* | 12/2017 | Liu | H04L 67/2842 |
| 2005/0198113 A1 | 9/2005 | Mohamed et al. | |
| 2015/0032877 A1 | 1/2015 | Li | |
| 2016/0026604 A1* | 1/2016 | Pandit | G06F 15/17 |
| | | | 709/212 |

OTHER PUBLICATIONS

"Mellanox OFED GPUDirect RDMA", Mellanox, [online], <URL:http://jp.mellanox.com/page/products_dyn?product_family=116&mtag=gpudirect>, retrieved on Mar. 23, 2017 with English version (5 pages).

* cited by examiner

MANAGING INPUT/OUTPUT CORE PROCESSING VIA TWO DIFFERENT BUS PROTOCOLS USING REMOTE DIRECT MEMORY ACCESS (RDMA) OFF-LOADING PROCESSING SYSTEM

CROSS-REFERENCE TO RELATED APPLICATION

This application is based upon and claims the benefit of priority of the prior Japanese Patent Application No. 2017-132037, filed on Jul. 5, 2017, the entire contents of which are incorporated herein by reference.

FIELD

The embodiment discussed herein is related to an information processing system, an information processing device, and a control method of the information processing system.

BACKGROUND

A parallel computer system such as a supercomputer or the like includes a plurality of computing nodes. Central processing units (CPUs) as arithmetic processing devices possessed by the respective computing nodes are coupled to each other via an interconnect.

A related technology is disclosed in Japanese National Publication of International Patent Application No. 2007-527057, Japanese Laid-open Patent Publication No. 2015-22755, Non-Patent Document 1: NVIDIA, "NVIDIA GPU-Direct," [retrieved on Mar. 23, 2017], Internet URL: https://developer.nvidia.com/gpudirect, or Non-Patent Document 2: Mellanox, "Mellanox OFED GPUDirect RDMA," [retrieved on Mar. 23, 2017], Internet <URL: http://jp.mellanox.com/page/products_dyn?product_family=116&mtag=gpudirec t>.

SUMMARY

According to an aspect of the embodiment, an information processing system includes: a first information processing device configured to transmit an input/output request to an information storage device; and a second information processing device coupled to the information storage device and configured to: perform an operation; retain an address value in a register; store the input/output request received from the first information processing device in a memory; output a reception notification indicating reception of the input/output request based on a result of comparison between a physical address of the memory, the input/output request being stored at the physical address, and the address value; generate a packet based on the input/output request stored at the physical address of the memory when receiving the reception notification; and output the generated packet to the information storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

As an example of a configuration of a parallel computer system, there is a configuration in which some of a plurality of computing nodes are coupled to a file server including a storage device in which data is recorded. Here, a computing node coupled to the file server is referred to as an input output (I/O) and computing node.

A computing node not coupled to the file server transmits an input/output request requesting input/output processing such as writing processing, reading processing, or the like to the IO and computing node, and writes data to the file server or reads data from the file server via the IO and computing node.

For example, input/output processing is off-loaded from a first computer to a second computer by using a network interconnection supporting remote direct memory access (RDMA). For example, information is collected from individual memories of a plurality of networked computing elements.

For example, transfer is performed directly from a transfer source to a transfer destination without the intervention of a CPU by combining Peer-to-Peer communication of peripheral component interconnect express (PCI Express) and RDMA with each other.

When the IO and computing node receives a request for input/output processing from a computing node while the IO and computing node is performing computation processing, the IO and computing node interrupts the computation processing, and performs input/output processing such as data transmission or reception to or from the file server or the like. Thus, the computation performance of the IO and computing node may be decreased.

For example, when processing based on an input/output request is performed between a plurality of information processing devices, a load on an arithmetic processing unit possessed by an information processing device as a transmission destination of the input/output request may be reduced.

As the number of computing nodes using a shared file system, for example, is increased to reduce the cost of the entire system, a processing load on the CPU of the IO and computing node may be increased, thus hindering arithmetic processing and degrading performance. When the number of cores within the CPU performing input/output processing is increased to deal with this, the chip area of the CPU may be increased, and consequently a manufacturing cost may be increased.

Transfer is directly performed from a transfer source to a transfer destination without the intervention of software and the CPU by combining Peer-to-Peer communication of PCI Express and RDMA, in which direct data transfer is performed without imposing a load on the CPU core. However, the technology in question is simple inter-memory transfer between two nodes, and it may be difficult to apply the technology to data movement between different protocols, as in performing input/output processing between a plurality of nodes via two or more kinds of interconnects using different protocols, for example.

Figure 1:
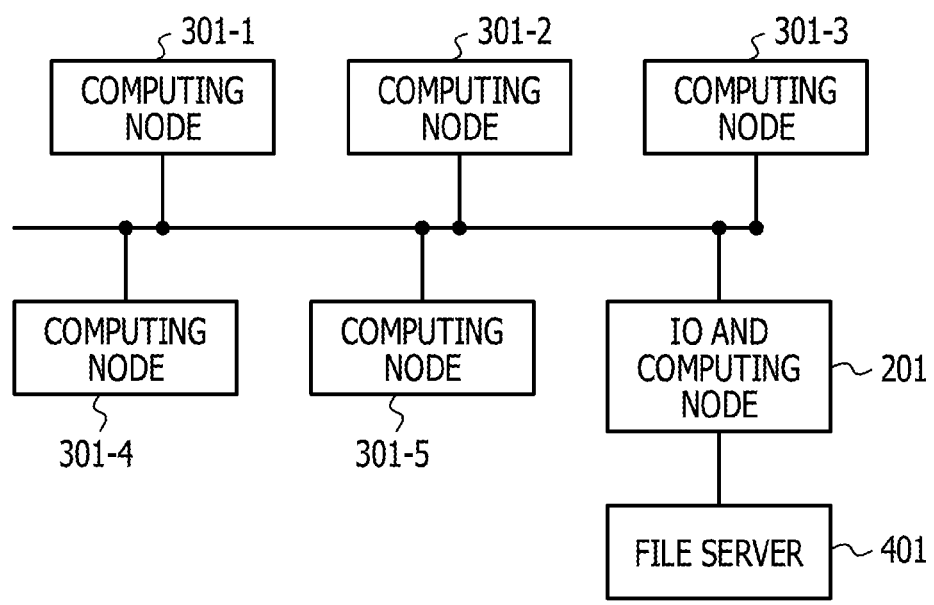
FIG. 1 illustrates an example of an information processing system.

FIG. 1 illustrates an example of an information processing system. An information processing system 101 includes an IO and computing node 201, a computing node 301-$i$ ($i$=1 to 5), and a file server 401. The information processing system 101 performs parallel computation using the IO and computing node 201 and the computing node 301-$i$. The information processing system 101 is a parallel computer such as a supercomputer or the like.

A CPU of the IO and computing node 201 couples to and is able to mutually communicate with a CPU of another computing node 301-$i$ via a Torus fusion (Tofu) interconnect as a kind of interconnect. The IO and computing node 201 is coupled to the file server 401 by InfiniBand. The IO and computing node 201 is an example of an information processing device. The IO and computing node 201 may hereinafter be described as an IO node 201. The number of IO and computing nodes 201 in the embodiment is an example. The number of IO and computing nodes 201 may be two or more.

The computing node 301-$i$ performs computation processing, and transmits, to the IO and computing node 201, an input/output request requesting reading or writing of data from or to the file server 40. The computing node 301-$i$ is an example of a computation processing device or an information processing device.

The file server 401 couples to the IO and computing node 201 by InfiniBand, and is able to mutually communicate with the IO and computing node 201. The file server 401 includes a storage device. The file server 401 writes data received from the IO and computing node 201 to the storage device, or reads data from the storage device and transmits the data to the IO and computing node 201. The file server 401 is an example of an information storage device.

The number of computing nodes 301-$i$ is an example. The number of computing nodes 301-$i$ may be other than five.

Figure 2:
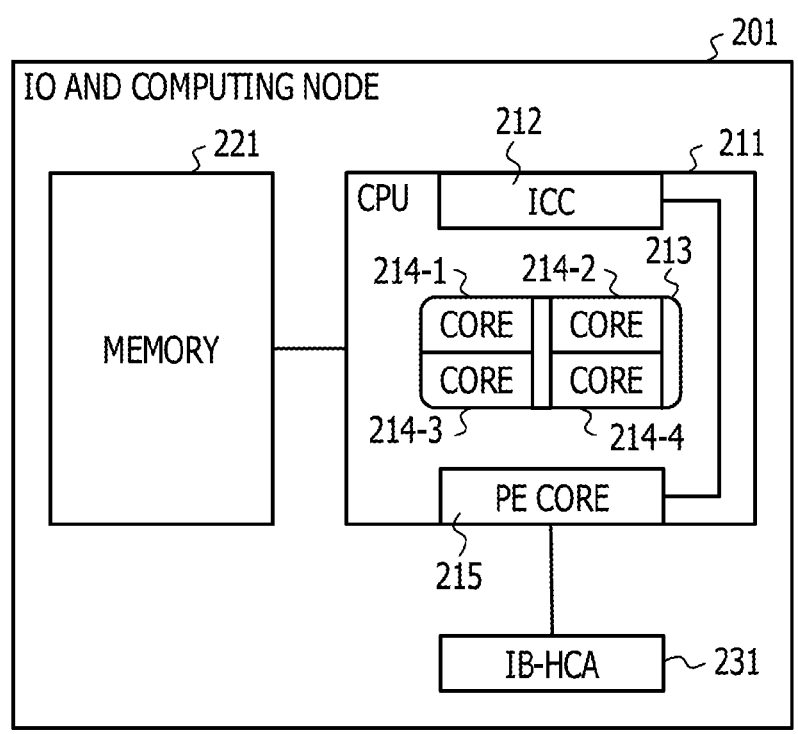
FIG. 2 illustrates an example of an input output (IO) and computing node.

FIG. 2 illustrates an example of an IO and computing node. The IO and computing node 201 includes a CPU 211, a memory 221, and an InfiniBand host channel adapter (IB-HCA) 231.

The CPU 211 includes an interconnect core (ICC) 212, a core group 213, a PCI Express core (PE core) 215, and a path 216.

The ICC 212 is a controller as a first control unit that couples to an ICC 312-$i$ of the computing node 301-$i$ by a Tofu interconnect, and performs RDMA to a memory 321-$i$ of the computing node 301-$i$ by using packets and a protocol defined in the Tofu interconnect.

The ICC 212 directly couples to the PE core 215 via the path 216. The ICC 212 is a communicating unit that may directly communicate with the PE core 215 by using the path 216. The path 216 is an example of a communication path.

The ICC 212 determines whether an input/output request received from the computing node 301-$i$ is an input/output request to a remote node (IO and computing node 201). When the input/output request received from the computing node 301-$i$ is an input/output request to the remote node, the ICC 212 notifies the PE core 215 via the path 216 that an input/output request to the IO and computing node 201 is received.

The core group 213 includes a core 214-$j$ ($j$=1 to 4). The core 214-$j$ performs arithmetic (computation) processing by reading data from the memory 221 and executing software. The core 214-$j$ is an example of an arithmetic processing unit.

The PE core 215 is a controller as a second control unit that couples to the IB-HCA 231, and couples to the IB-HCA 231 and performs communication processing by using packets and a protocol defined in PCI Express. When the PE core 215 receives the notification from the ICC 212, the PE core 215 generates a PCI packet defined in PCI Express from the input/output request read from the input/output request memory 221, and transmits the PCI packet to the IB-HCA 231.

The memory 221 is a storage unit that stores data and a program. The memory 221 is, for example, a Random Access Memory.

The IB-HCA 231 couples to the PE core 215, and communicates with the PE core 215 by using PCI packets and the protocol defined in PCI Express. The IB-HCA 231 couples to an IB-HCA possessed by the file server 401 by InfiniBand, and performs communication using InfiniBand. The IB-HCA 231 is an example of a communicating unit.

The ICC 212, the PE core 215, and the path 216 may be located outside the CPU 211.

The IO and computing node 201 has an InfiniBand virtualization function, and performs the concerned virtualization function. Consequently, the computing nodes 301-$i$ ($i$=1 to 5) appear to couple to respective different virtualized IB-HCAs, and are each able to control InfiniBand independently. Incidentally, the performance of the virtualization function hardly changes the usage rate of the core 214-$j$ of the CPU 211. Therefore a load of the virtualization function on the core 214-$j$ hardly affects computation processing.

Figure 3:
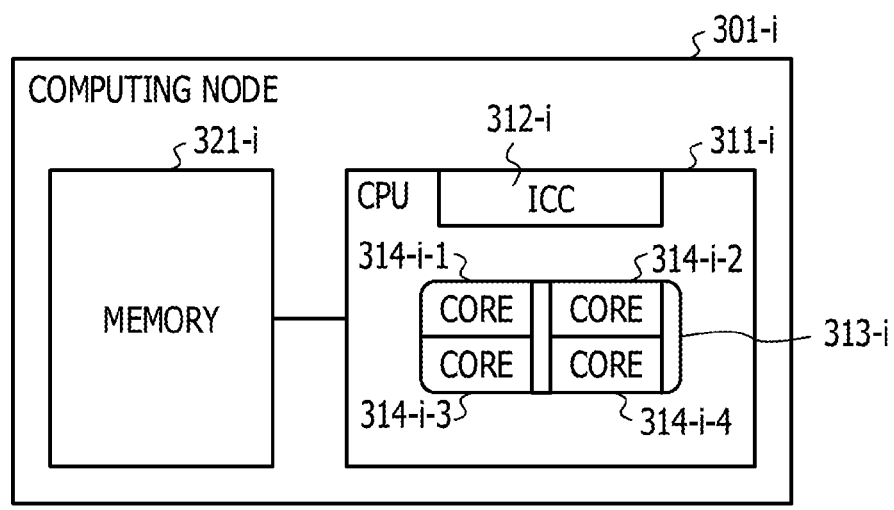
FIG. 3 illustrates an example of a computing node.

FIG. 3 illustrates an example of a computing node. The computing node 301-$i$ ($i$=1 to 5) includes a CPU 311-$i$ and a memory 321-$i$.

The CPU 311-$i$ includes an ICC 312-$i$ and a core group 313-$i$. The ICC 312-$i$ is a controller that couples to the ICC 212 of the IO and computing node 201 by a Tofu interconnect, and performs RDMA to the memory 221 of the IO and computing node 201 by using packets and a protocol defined in the Tofu interconnect.

The core group 313-$i$ includes a core 314-$i$-$j$ ($i$=1 to 5 and $j$=1 to 4). The core 314-$i$-$j$ performs computation processing by reading a program from the memory 321-$i$ and executing the program.

The memory 321-$i$ is a storage unit that stores data and a program used by the computing node 301-$i$. The memory 321-$i$ is, for example, a Random Access Memory. The computing node 301-$i$ may use a configuration similar to that of the IO and computing node 201.

Figure 4:
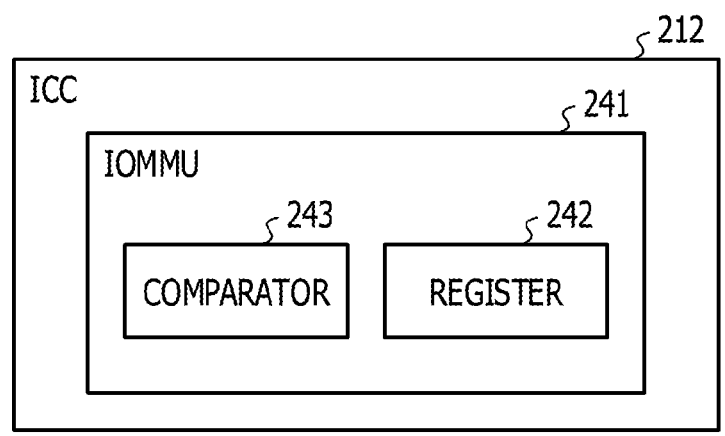
FIG. 4 illustrates an example of an interconnect core (ICC)

FIG. 4 illustrates an example of an ICC. The ICC 212 includes an input output memory management unit (IOMMU) 241.

The IOMMU 241 converts a virtual address (VA) included in an input/output request received from the computing node 301-$i$ into a physical address (PA) of the memory 221. The IOMMU 241 includes a register 242 and a comparator 243.

The register 242 stores a physical address (buffer address) of the memory 221 to which address the input/output request to the file server 401 is written. The physical address stored by the register 242 is, for example, set by software executed by the IO and computing node 201 at a time of a start of the information processing system 101. Here, an area of the memory 221 to which area the input/output request is written will be referred to as a buffer. The register 242 may uniquely store buffer addresses for the computing nodes 301-$i$ ($i$=1 to 5) as initial values in advance, and allow software to make readout access to the buffer addresses.

The comparator 243 compares the physical address converted from the virtual address in the IOMMU 241 with an address value included in the register 242 and stored in advance in the register 242. When the physical address coincides with the address value, the IOMMU 241 notifies the PE core 215 of the effect that an input/output request is received (detected).

Figure 5:
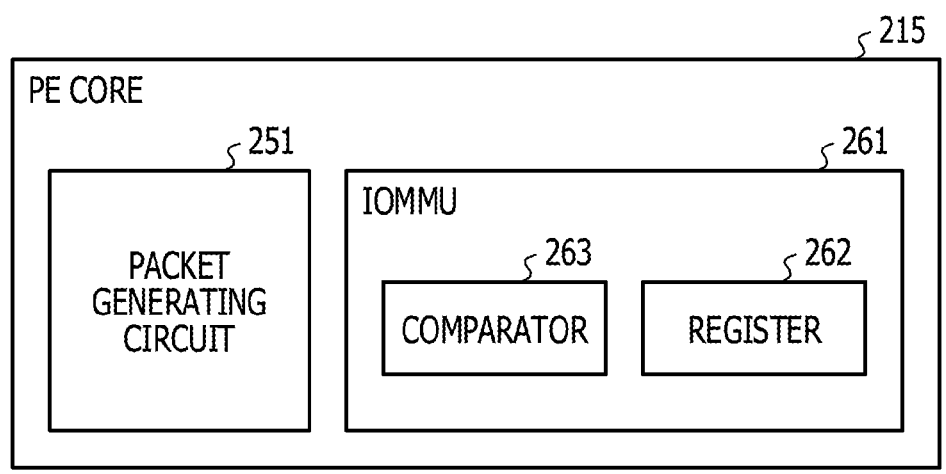
FIG. 5 illustrates an example of a peripheral component interconnect express (PE) core.

FIG. 5 illustrates an example of a PE core. The PE core 215 includes a packet generating circuit 251 and an IOMMU 261.

The packet generating circuit 251 reads the input/output request from the memory 221, generates a PCI packet from the input/output request, and transmits the generated PCI packet to the IB-HCA 231.

The IOMMU 261 converts a virtual address (VA) included in a DMA request received from the IB-HCA 231 into a physical address (PA) of the memory 221. The IOMMU 261 includes a register 262 and a comparator 263.

The register 262 stores a physical address (buffer address) of the memory 221 to which address the input/output request is written. The physical address stored by the register 262 is set by software executed by the IO and computing node 201 at a time of a start of the information processing system 101, for example.

Figure 6:
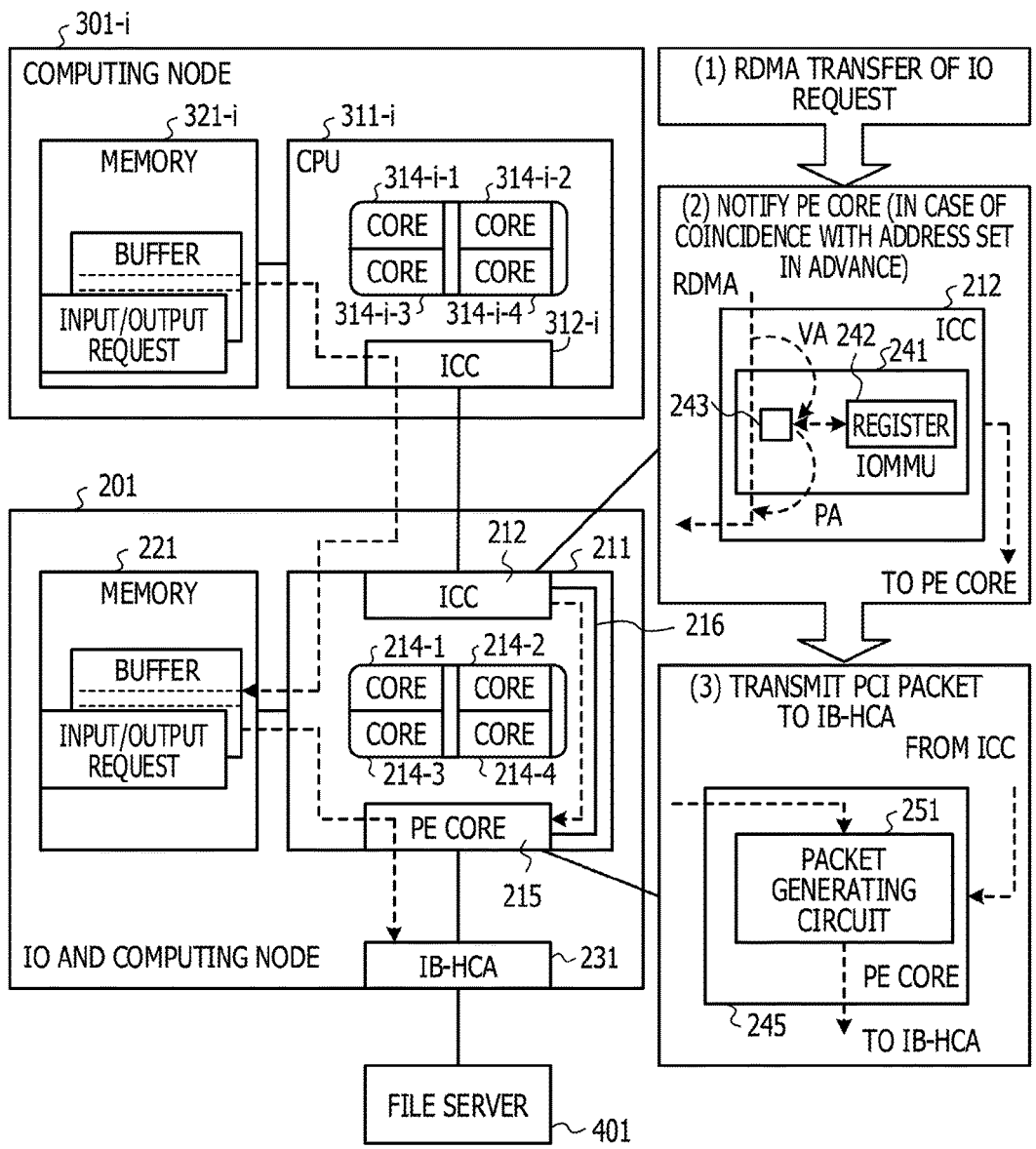
FIG. 6 illustrates an example of input/output request processing.

FIG. 6 illustrates an example of input/output request processing. The ICC 212 and the PE core 215 are coupled to each other by a bus 216. Broken line arrows in FIG. 6 indicate flows of an input/output request, a notification, and the like.

The information processing system 101 performs the input/output request processing by the following procedure, for example. FIG. 6 illustrates the processing in a case where an input/output request is transmitted from one computing node 301-$i$ to the IO and computing node 201.

(1) Software executed by the core 314-$i$-$j$ ($i$=1 to 5 and $j$=1 to 4) of the computing node 301-$i$ ($i$=1 to 5) issues an input/output request to the IO and computing node 201. The input/output request is stored in a buffer as an area for storing the input/output request within the memory 321-$i$. The input/output request includes a virtual address of a writing destination of the input/output request. The concerned virtual address corresponds to a physical address of the memory 221 at which address the input/output request to the file server 401 is stored.

(2) The ICC 312-$i$ writes the input/output request to the memory 221 of the IO and computing node 201 by using an RDMA transfer function. The IOMMU 241 of the ICC 212 converts the virtual address included in the input/output request into a physical address of the memory 221. The comparator 243 reads a given address value stored in advance from the register 242, and compares the converted physical address with the address value read from the register 242. When the converted physical address and the address value read from the register 242 coincide with each other, the ICC 212 notifies the PE core 215 via the path 216 that an input/output request is received (detected).

(3) The PE core 215 receives the notification, and reads the input/output request written to the memory 221 from the memory 221. The packet generating circuit 251 generates a PCI packet from the read input/output request, and transmits the generated PCI packet to the IB-HCA 231.

Figure 7:
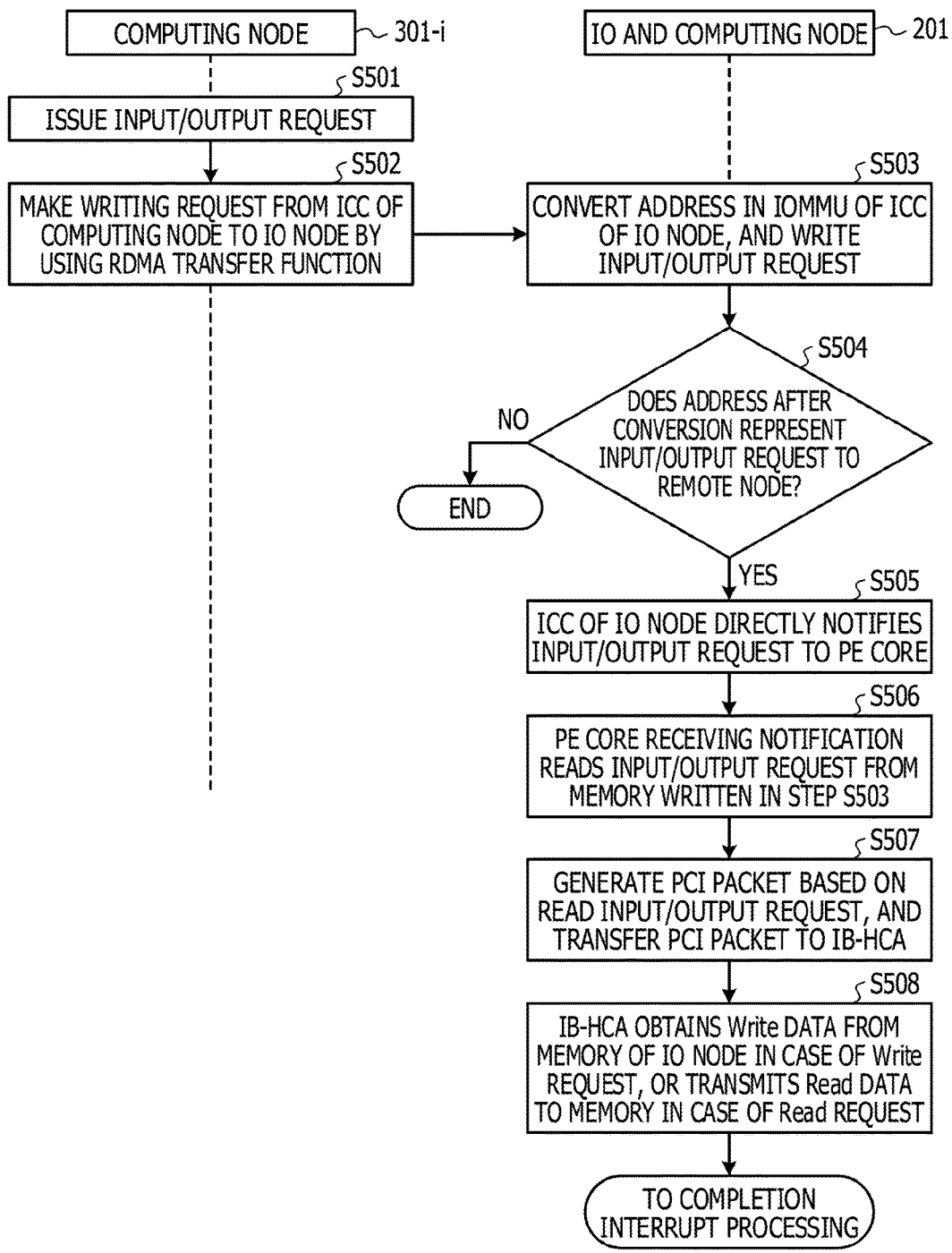
FIG. 7 illustrates an example of input/output request processing.

FIG. 7 illustrates an example of input/output request processing. Suppose that a physical address of the memory 221 at which address an input/output request to the file server 401, the input/output request being transmitted from the computing node 301-$i$ to the IO and computing node 201, is stored is set in the register 242 of the IOMMU 241. In addition, suppose that a physical address of the memory 221 at which address a DMA request received from the IB-HCA 231 and including an RDMA request from the IO and computing node 201 to the computing node 301-$i$ is stored is set in the register 262 of the IOMMU 261. In addition, suppose that the core 214-$j$ of the IO and computing node 201 is performing arithmetic processing using a program and data stored in the memory 221. With reference to FIG. 7, description will be made of a case where an input/output request is transmitted from one computing node 301-$i$ to the IO and computing node 201.

In step S501, software executed by the core 314-$i$-$j$ of the computing node 301-$i$ issues an input/output request to the IO and computing node 201. Incidentally, the input/output request includes a virtual address of a writing destination of the input/output request. The concerned virtual address corresponds to a physical address of the memory 221 at which address to store the input/output request. In addition, the input/output request includes a request for input/output processing such as writing or reading to or from the file server 401 or the like. In a case where the input/output request is a request for writing (Write) to the file server 401, the input/output request includes writing (write) data.

In step S502, the ICC 312-$i$ transmits the input/output request and a request to write the input/output request to memory to the IO and computing node 201 by using the RDMA transfer function.

In step S503, the IOMMU 241 of the ICC 212 converts the virtual address included in the received input/output request into a physical address of the memory 221, and stores the input/output request in an area indicated by the converted physical address of the memory 221.

In step S504, the comparator 243 reads a given address value stored in advance from the register 242, and compares the converted physical address with the address value read from the register 242. When the converted physical address and the address value read from the register 242 coincide with each other, the control proceeds to step S505. When the converted physical address and the address value read from the register 242 do not coincide with each other, the ICC 212 makes the core 214-$j$ perform processing for the input/output request stored in the memory 221. The input/output request processing is then ended. For example, when the converted physical address and the address value read from the register 242 do not coincide with each other, the core 214-$j$ performs input/output processing such as writing or reading to or from the file server 401 or the like.

In step S505, the ICC 212 notifies the PE core 215 via the path 216 that an input/output request is received (detected).

In step S506, the PE core 215 receives the notification, and reads the input/output request written to the memory 221 in step S503 from the memory 221.

In step S507, the packet generating circuit 251 generates a PCI packet from the read input/output request, and transmits the generated PCI packet to the IB-HCA 231. The IB-HCA 231 transmits the received PCI packet to the file server 401 by using InfiniBand.

In step S508, when the input/output request is a request for writing (Write) to the file server 401, the PE core 215 reads the write data from the memory 221, and transmits the write data to the IB-HCA 231. The IB-HCA 231 transmits the received write data to the file server 401. The file server 401 writes the received write data.

Figure 8:
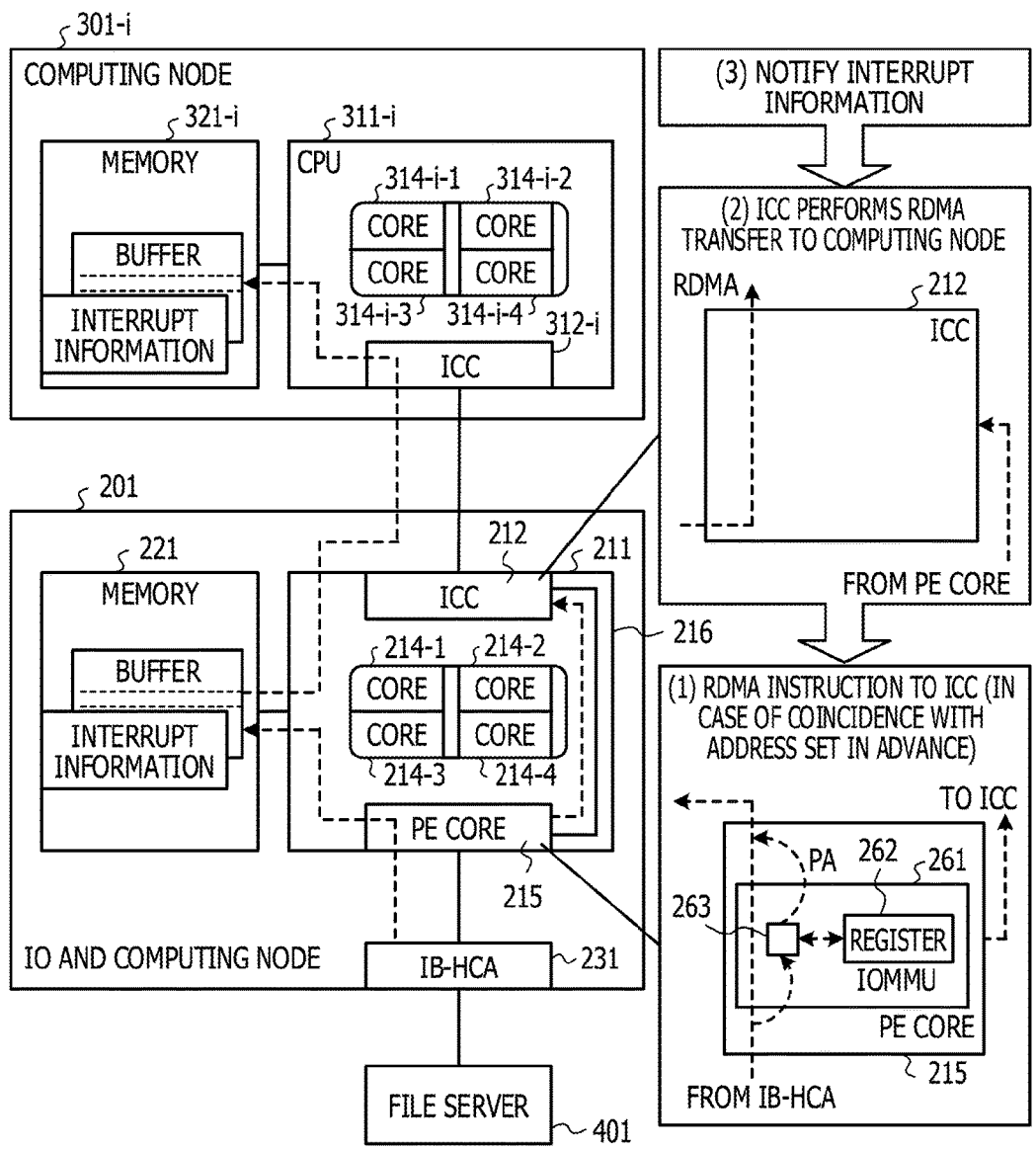
FIG. 8 illustrates an example of completion interrupt processing.

FIG. 8 illustrates an example of completion interrupt processing. The information processing system 101 performs the completion interrupt processing by the following procedure, for example. FIG. 8 illustrates the processing at a time of completion of the writing of data to the file server 401 or the reading of data from the file server 401 after the input/output request processing in FIG. 6. Broken line arrows in FIG. 8 indicate flows of an input/output request, a notification, and the like.

(1) The IB-HCA 231 issues a DMA Write (DMA request) indicating an interrupt, and transmits the DMA Write (DMA request) to the PE core 215. In addition, the DMA request includes an RDMA request requesting RDMA. The RDMA request may be described as interrupt information. The PE core 215 receives the DMA request. The IOMMU 261 of the PE core 215 converts a virtual address included in the DMA request into a physical address of the memory 221, and writes the DMA request to the memory 221. The comparator 263 reads an address value stored in advance from the register 262, and compares the converted physical address with the address value read from the register 242. When the converted physical address and the address value read from the register 262 coincide with each other, the IOMMU 261 notifies the ICC 212 via the path 216 that an RDMA request is received (detected).

(2) The ICC 212 receives the notification, reads the RDMA request included in the DMA request written to the memory 221 from the memory 221, and transfers the RDMA request to the memory 321-i of the computing node 301-i by using RDMA.

(3) The computing node 301-i receives the RDMA request, and notifies, based on the received RDMA request, the software executed in the computing node 301-i that processing for the input/output request is completed.

Figure 9:
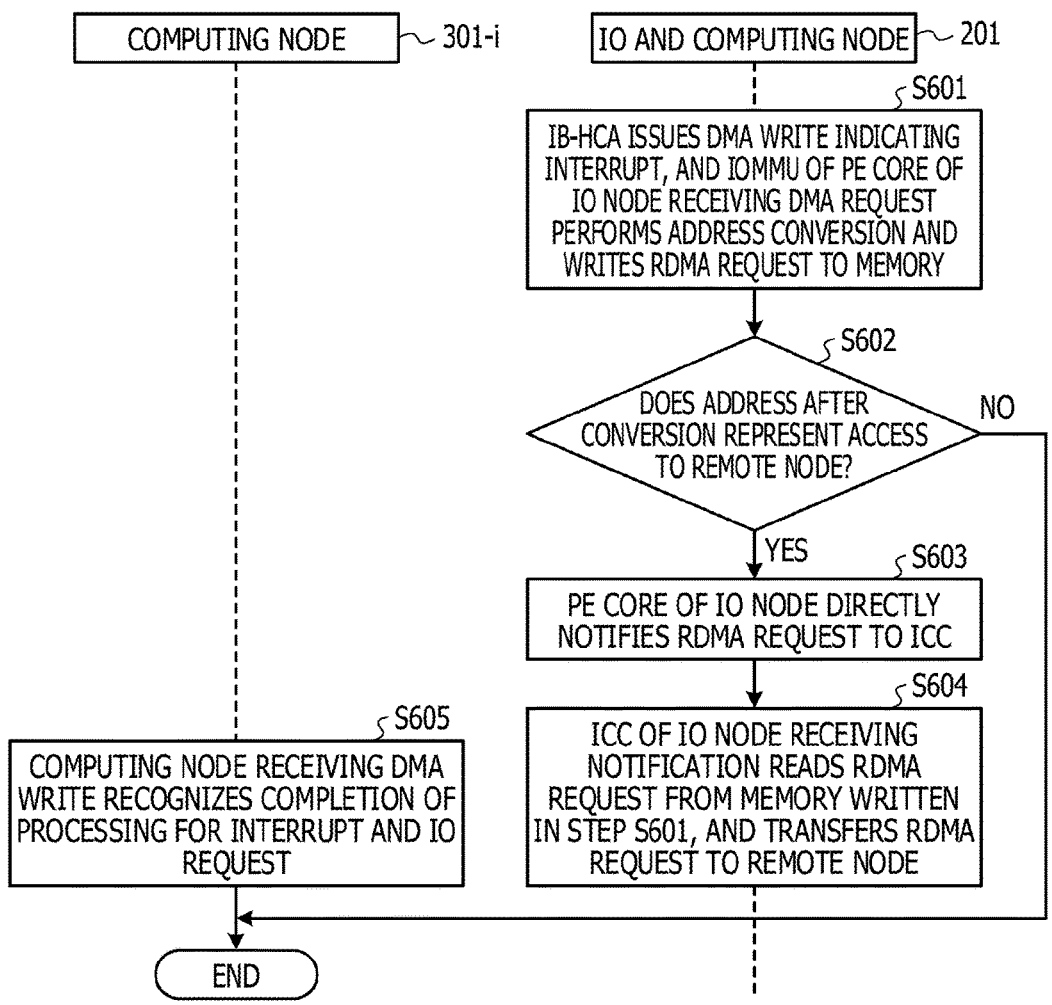
FIG. 9 illustrates an example of completion interrupt processing.

FIG. 9 illustrates an example of completion interrupt processing. The completion interrupt processing is started by being triggered by transmission of write data to the file server 401 or transmission of read data to the PE core 215 by the IB-HCA 231.

In step S601, the IB-HCA 231 issues a DMA Write as a DMA request indicating an interrupt, and transmits the DMA Write to the PE core 215. The DMA request includes an RDMA request requesting RDMA from the IO and computing node 201 to the computing node 301-i. The DMA request includes a virtual address. The concerned virtual address corresponds to a physical address of the memory 221 at which address to store the DMA request including the RDMA request. The PE core 215 receives the DMA request. The IOMMU 261 of the PE core 215 converts the virtual address included in the DMA request into a physical address of the memory 221, and writes the DMA request to the memory 221.

In step S602, the comparator 263 reads an address value stored in advance from the register 262, and compares the converted physical address with the address value read from the register 262. When the converted physical address and the address value read from the register 262 coincide with each other, the control proceeds to step S603. When the converted physical address and the address value read from the register 262 do not coincide with each other, the completion interrupt processing is ended. For example, whether the DMA request is a DMA request for access from the JO and computing node 201 to the computing node 301-i as a remote node is determined based on the converted physical address.

In step S603, the IOMMU 261 notifies the ICC 212 via the path 216 the effect that an RDMA request is received.

In step S604, the ICC 212 receives the notification, reads the RDMA request included in the DMA request written to the memory 221 in step S601 from the memory 221, and transfers the RDMA request to the computing node 301-i.

In step S605, the computing node 301-i receives the RDMA request, and recognizes, based on the received RDMA request, completion of processing for the interrupt and the input/output request.

According to the information processing system in accordance with the embodiment, the ICC 212 and the PE core 215 perform processing for an input/output request between a computing node and the JO and computing node in place of the core 214-j. A load on the core 214-j performing computation processing is therefore reduced. Consequently, a decrease in computation performance of the IO and computing node 201 may be suppressed. In a case where processing for an input/output request is performed by cores of a CPU, 0.7 cores are occupied on an average, and four cores are occupied at a peak time. On the other hand, in processing for an input/output request by the JO and computing node 201 according to the embodiment, less than 0.1 cores are occupied on an average, and less than 0.1 cores are occupied at a peak time. Thus, the embodiment greatly reduces a load of the core 214-j of the IO and computing node 201 for an input/output request.

According to the information processing system, input/output processing via two different bus protocols such as the Tofu interconnect and PCIe from the computing node 301-i may be controlled by using the ICC 212 and the PE core 215 in place of the core 214-j.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
 a first information processing device configured to transmit an input/output request to an information storage device; and
 a second information processing device coupled to the information storage device and configured to:
 perform an operation;
 retain an address value in a register;
 store the input/output request received from the first information processing device in a memory;
 output a reception notification indicating reception of the input/output request based on a result of comparison between a physical address of the memory, the input/output request being stored at the physical address, and the address value;

generate a packet based on the input/output request stored at the physical address of the memory when receiving the reception notification; and output the generated packet to the information storage device, a first communication path configured to couple the first information processing device and the second information processing device to each other and a second communication path configured to couple the second information processing device and the information storage device to each other use different protocols.

2. The information processing system according to claim 1, wherein the second information processing device outputs the reception notification indicating the reception of the input/output request when the physical address of the memory and the address value coincide with each other in the result of the comparison.

3. The information processing system according to claim 1, wherein the second information processing device processes the input/output request when the physical address of the memory and the address value do not coincide with each other in the result of the comparison.

4. An information processing device comprising:
 a memory;
 a processor coupled to the memory and configured to:
  perform an operation;
  retain an address value in a register;
  receive an input/output request which another information processing device transmits to an information storage device;
  store a received input/output request in the memory;
  output a reception notification indicating reception of the input/output request based on a result of comparison between a physical address of the memory, the input/output request being stored at the physical address, and the address value;
  generate a packet based on the input/output request stored at the physical address of the memory when receiving the reception notification; and
  output the generated packet to the information storage device,
 a first communication path configured to couple the another information processing device and the information processing device to each other and a second communication path configured to couple the information processing device and the information storage device to each other use different protocols.

5. The information processing device according to claim 4, wherein the processor outputs the reception notification indicating the reception of the input/output request when the physical address of the memory and the address value coincide with each other in the result of the comparison.

6. The information processing device according to claim 4, wherein the processor processes the input/output request when the physical address of the memory and the address value do not coincide with each other in the result of the comparison.

7. A control method of an information processing system comprising:
 performing, by a computer of a second information processing device in the information processing system, an operation;
 retaining an address value in a register;
 receiving an input/output request which a first information processing device in the information processing system transmits to an information storage device;
 storing a received input/output request in a memory;
 outputting a reception notification indicating reception of the input/output request based on a result of comparison between a physical address of the memory, the input/output request being stored at the physical address, and the address value;
 generating a packet based on the input/output request stored at the physical address of the memory when receiving the reception notification; and
 outputting the generated packet to the information storage device,
 a first communication path configured to couple the first information processing device and the second information processing device to each other and a second communication path configured to couple the second information processing device and the information storage device to each other use different protocols.

8. The control method device according to claim 7, further comprising:
 outputting the reception notification indicating the reception of the input/output request when the physical address of the memory and the address value coincide with each other in the result of the comparison.

9. The control method according to claim 7, further comprising:
 processing the input/output request when the physical address of the memory and the address value do not coincide with each other in the result of the comparison.

* * * * *